US006823884B2

(12) United States Patent
Kern et al.

(10) Patent No.: US 6,823,884 B2
(45) Date of Patent: Nov. 30, 2004

(54) METHOD FOR CONTROLLING PRESSURE

(75) Inventors: Christoph Kern, Weil der Stadt (DE); Wolfram Schroeder, Wildberg (DE); Daniel Schulz, Winnipeg (CA)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/350,186

(22) Filed: Jan. 24, 2003

(65) Prior Publication Data

US 2003/0173805 A1 Sep. 18, 2003

(30) Foreign Application Priority Data

Jan. 24, 2002 (DE) ........................................ 102 02 579

(51) Int. Cl.[7] ......................... G05D 16/20; A47C 27/10

(52) U.S. Cl. ....................... 137/14; 137/487.5; 137/596; 297/284.6; 297/DIG. 3; 5/710; 5/713

(58) Field of Search ........................ 297/284.6, DIG. 3; 137/12, 14, 487.5, 488, 596; 5/710, 713

(56) References Cited

U.S. PATENT DOCUMENTS

| | | | | | |
|---|---|---|---|---|---|
| 4,949,412 | A | * | 8/1990 | Goode | 5/713 |
| 5,044,029 | A | * | 9/1991 | Vrzalik | 5/713 |
| 5,142,717 | A | * | 9/1992 | Everard et al. | 5/709 |
| 5,283,735 | A | * | 2/1994 | Gross et al. | 600/587 |
| 5,794,288 | A | * | 8/1998 | Soltani et al. | 5/713 |
| 5,944,049 | A | * | 8/1999 | Beyer et al. | 137/487.5 |
| 6,088,642 | A | * | 7/2000 | Finkelstein et al. | 701/49 |
| 6,094,762 | A | | 8/2000 | Viard et al. | |
| 6,098,000 | A | * | 8/2000 | Long et al. | 701/49 |
| 6,427,538 | B1 | * | 8/2002 | Potter | 73/706 |

FOREIGN PATENT DOCUMENTS

| | | |
|---|---|---|
| DE | 4210049 | 4/1993 |
| DE | 19515050 | 5/1996 |
| DE | 3804959 | 9/2000 |
| JP | 11342776 | 12/1999 |
| WO | 98/37790 | 9/1998 |
| WO | 00/03623 | 1/2000 |

* cited by examiner

*Primary Examiner*—Ramesh Krishnamurthy
(74) *Attorney, Agent, or Firm*—Crowell & Moring LLP

(57) ABSTRACT

A process for increasing or reducing the internal pressure of at least one hollow body (HK_1, HK_2, HK_3) to a specified set internal pressure. The set internal pressure is adjusted so that several pressure-increasing steps or pressure-reducing steps are conducted successively until the internal pressure deviates from the set internal pressure at most by a specified tolerance. Each of these steps brings about a pressure increase or pressure reduction the amount of which is not larger than a specified upper limit. In this way, impairments of comfort owing to the rise in pressure or the reduction in pressure are especially avoided. The actual internal pressure is only measured at the beginning of the process. In one design of the invention, this amount depends upon the volumes of the hollow bodies (HK_1, HK_2, HK_3) and a supply line (VL) as well as (in the case pressure is increased) from the pressure which a pressure generator generates.

15 Claims, 1 Drawing Sheet

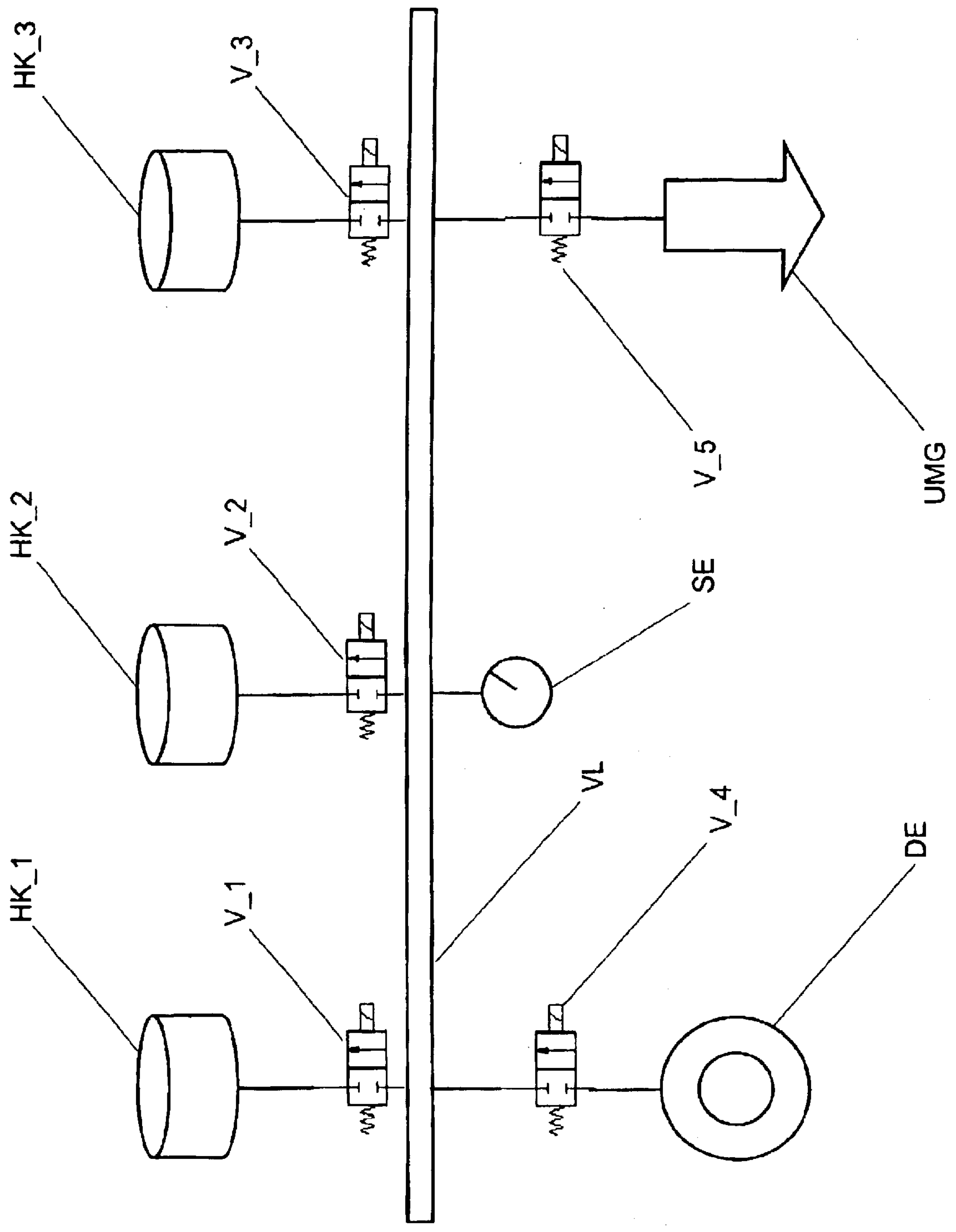
HK_3
V_3
HK_2
V_2
HK_1
V_1
VL
V_4
DE
SE
V_5
UMG

METHOD FOR CONTROLLING PRESSURE

BACKGROUND AND SUMMARY OF THE INVENTION

This application claims the priority of 102 02 579.7, filed Jan. 24, 2002, the disclosure of which is expressly incorporated by reference herein.

The invention concerns a method for raising or lowering the interior pressure of a hollow body to a specified set internal pressure.

One or more hollow bodies are to be provided with various set internal pressures. These set pressures can be different and/or vary over time. As an example, if the hollow bodies are part of a comfort system in a motor vehicle, for example, a system with pneumatically adjustable seats, then the set pressures depend upon the wish of the occupants. The hollow bodies are, moreover, not only to be brought to specified internal pressures in a short time. In addition, a reduction in passenger comfort level with a sudden change in pressure noticeable to the occupants should be avoided. Furthermore, adjusting the set pressures should require as few sensors and as few pressure measurements as possible.

A method for filling hollow bodies with the aid of a pressure generator is known from German Reference DE 3804959 C2. The application is disclosed that the hollow body is a set of air chambers of a seat, for example, of a motor vehicle, that the pressure generator includes a pump. After measuring the actual internal pressure of one of the hollow bodies, its internal pressure is first rapidly brought to a value near a specified set internal pressure. When a ventilation valve is closed, the actual internal pressure obtained is compared with the set internal pressure and pressure is applied again in the event of a deviation. Pressure is preferably administered with a diminished filling rate after the first comparison, for example, by a pump with reduced rotational speed or a ventilation valve with diminished through flow.

The method disclosed in German Reference DE 3804959 C2 can lead to a noticeable, indeed jerky, change in pressure, for example, in the case of a motor vehicle seat, especially with a large deviation between set and actual internal pressure. This change in pressure is felt to be a restriction in sitting comfort precisely when the approximate set internal pressure is reached, and under certain circumstances, the seat occupant is even frightened or irritated. The advantageous configuration described above, moreover, requires extra or expensive apparatus, for example, various valves or a controllable pump.

A pressure supply facility for at least two users is known from German Reference DE 4210049 C1. At least two users are to be provided with two different nominal pressures. One pressure generator is to be activated so that it supplies each of the two required nominal pressures. The facility accomplishes the objective, certain to prevent the user with the lower pressure from being acted upon with the higher nominal pressure. This is attained with a protective circuit in which certain switch settings can only be reached at certain levels of pressure. How to avoid a rapid change in pressure while supplying pressure and how an overshot of the pressure curve is avoided are not disclosed.

A method for driving stability control switching with control through pressure gradients is disclosed in German Reference DE 19515050 A1. A regulating unit receives a reference speed $V_{ref}$ and a steering angle δ as input magnitudes. The angle of yaw g and the angle of yaw rate P are regulated, among other things. Pressure p in the wheel brakes is a manipulated variable. The absolute pressure is not specified, but rather pressure alteration signals that prescribe whether the pressure should be increased or diminished on individual wheel brakes. The change in pressure depends upon the measured magnitudes of the motor vehicle, for example, a required additional yaw factor. In order to determine the change in pressure, sensors are needed not only for the pressure, but also for further magnitudes.

The invention is based upon the objective of creating a method of the type mentioned at the beginning that avoids the disadvantages of the state of the art. In particular, abrupt or major changes in pressure are to be avoided and the method should manage with as few sensors and as few pressure measurements as possible.

In order to raise the internal pressure of a hollow body to a specified set internal pressure with a specified tolerance, a pressure generator connected with the hollow body is used. The actual internal pressure of the hollow body is determined before the elevation. Several pressure-raising steps are conducted in accordance with the invention. For each pressure-elevating step, the internal pressure of the hollow body is raised, on the one hand, by an amount that is smaller or equal to a specified upper limit for a pressure elevation in a hollow body. On the other hand, the amount of the pressure increase brought about by the pressure-raising step is calculated. Conducting these pressure elevation steps is broken off as soon as the sum on the basis of the actual internal pressure before the increase and the amounts of all previously conducted pressure elevations deviates from the set internal pressure by at most the specified tolerance.

In order to reduce the internal pressure of a hollow body to a specified set internal pressure with a specified tolerance, the hollow body is joined with a connection with the environment which has a lower pressure than the set internal pressure. The actual internal pressure is ascertained before the reduction. Several pressure-reducing steps are conducted in accordance with the invention. For each pressure reduction step, the internal pressure of the hollow body is diminished by the pressure decreasing step by an amount which is smaller or equal to a specified upper limit for a pressure reduction in the hollow body on the one hand. On the other hand, the amount of the pressure reduction brought about by the pressure-reducing step is determined. Conducting these pressure reduction steps is stopped as soon as the sum of the actual internal pressure prior to the reduction and the amounts of all previously conducted pressure reductions deviates from the set internal pressure by at most the specified tolerance.

A device for conducting the method of the invention for raising pressure includes,

- a pressure generator, a supply line between pressure generator, hollow body and environment, a sensor for measuring the internal pressure of the supply line, and a control device for conducting the pressure-increasing steps.

A device for conducting the method of the invention for reducing pressure includes,

- a supply line between pressure generator, hollow body and environment, a sensor for measuring the internal pressure of the supply line, and a control device for conducting the pressure-reducing steps.

The set internal pressure of the hollow body is slowly moved in several steps through the method. The upper limit of a pressure increase or pressure reduction is specified such that the respective requirements, for example as to comfort, are fulfilled. In this way, for example, an occupant of a passenger vehicle or a traveler on a bus does not observe any disturbing jerking owing to pressure changes in adjusting his/her seat, which is brought into a desired position in that the set internal pressures of hollow bodies in the seat are brought to specified values in accordance with the invention.

Overshooting the pressure curve is avoided by the method of the invention, thus temporarily assuming a value above the set internal pressure with a pressure increase and temporarily a value beneath the set internal pressure with a pressure reduction.

The method saves sensors and measurement processes. The actual internal pressure of the hollow body is measured once before the beginning of the change in pressure, which requires a sensor. Furthermore, the amounts of the increases in pressure or the pressure reductions are ascertained. In the event of a pressure increase, these amounts depend upon the pressure which the pressure generator generates, as well as according to the time span in which the pressure of the pressure generator applies to the hollow body, and/or upon the volume of the hollow body as well as on the supply line between pressure generator and hollow body. In the case of a reduction in pressure, these amounts depend, according to configuration of the time span in which the pressure of the pressure generator applies on the hollow body, and/or upon the volume of the hollow body as well as on that of a pressure line between pressure generator and hollow body. It is not necessary to measure the actual internal pressure of the hollow body during a pressure change again.

In accordance with one embodiment, at least one pressure-raising step is conducted through three increments.

In the first of these increments, a second valve and a further valve are closed and subsequently a first valve is opened. The second valve is situated between the pressure generator and a supply line which joins the pressure generator with the hollow body. The additional valve is situated between the hollow body and the supply line. The first valve is situated between the supply line and a connection with the environment.

In the following second increment, the first valve is closed and the second valve is opened. In the subsequent third increment, the second valve is closed and the additional valve is opened.

An advantageous configuration of these increments uses a first increment which is conducted at least until the internal pressure in the supply line is equal to ambient pressure. During a second increment, a constant pressure is generated by the pressure generator.

The second increment is conducted at least until the internal pressure in the supply line is equal to the pressure generated by the pressure generator. The third increment is conducted at least until the supply line and the hollow body have the same internal pressure.

This configuration saves monitoring the time span in which the first valve is opened between the supply line and the hollow body. It suffices if the first valve is opened until the actual internal pressures of the hollow body and supply line agree with sufficient exactitude. Here, it is sufficient for an immediate determination of the lower limit for this time span, which suffices for all practical internal pressures of the hollow body and the supply line. This time span comes to 0.5 sec, for example, with a seat system.

In another embodiment, the second increment is ended after a previously determined time span. The third increment is carried out until the supply line and the hollow body have the same internal pressure.

A further embodiment provides that the second increment is carried out at least until the internal pressure in the supply line is equal to the pressure generated by the pressure generator. The third increment is concluded following the expiration of a certain time span.

In many situations, the configurations require less time than other configurations because it is not necessary to wait until an identical internal pressure has occurred.

A method to determine the amount of pressure generated by the pressure generator according to the present invention is based on the volume of the hollow body, the volume of the supply line, the total on the basis of the actual internal pressure and the amounts of all previously conducted pressure-increasing steps, and the specified upper limit for a pressure elevation in the hollow body.

One configuration of the present invention is applicable for the case in which the pressure generator is connected with several hollow bodies. In accordance with the invention, pressure-increasing steps are conducted for several of these hollow bodies in an alternating manner.

A method for measuring the actual internal pressure of each hollow body by approximation prior to the increase by using a first valve is situated between the supply line and a connection with the environment, a second valve is situated between the pressure generator and a supply line which joins the pressure generator with the hollow body, and additional valves are situated between a hollow body and the supply line in each case.

The following steps are conducted for each hollow body successively:

The pressure in the supply line is reduced by closing the second valve, by closing the additional valve and by opening the first valve to ambient pressure.

Subsequently the first valve is closed and the additional valve for this hollow body is opened at least until the same internal pressure appears in the supply line and the hollow body.

The internal pressure which arises in the supply line is measured by a sensor on the supply line.

Analogously advantageous configurations provide for reducing the pressure.

In one configuration, at least one pressure reduction step is conducted through two increments. In the first of these increments, an additional valve and a first valve are opened. The additional valve is situated between the hollow body and the connection line. The first valve is situated between the environment and a connection line that joins the hollow body with the environment. In the subsequent increment, the first valve is closed and the additional valve is opened.

In another configuration, the first increment is conducted at least until the internal pressure in the supply line is equal to ambient pressure. The second increment is conducted at least until the internal pressure in the hollow body is equal to the internal pressure in the connection line.

Other objects, advantages and novel features of the present invention will become apparent from the following detailed description of the invention when considered in conjunction with the accompanying drawings.

BRIEF DESCRIPTION OF THE DRAWINGS

A design of the method of the invention will be described below in greater detail on the basis of the appended drawing, wherein:

The FIGURE shows an exemplary arrangement of three hollow bodies the internal pressures of which are brought to three set internal pressure in accordance with the invention.

DETAILED DESCRIPTION OF THE PREFERRED EMBODIMENTS

The exemplary arrangement consists of three hollow bodies HK_1, HK_2, HK_3, a pressure generator DE, a supply line VL and a connection UMG with the environment. The three hollow bodies are joined with the supply line through three valves V_1, V_2, V_3, the pressure generator DE through a valve V4 and the connection LIMG to the environment through a valve V_5. The pressure generator DE can generate various specified pressures since it presses compressed air into supply line VL. Each of the five valves can be opened and closed independently of the other four. Furthermore, the internal pressure in the supply line VL can be measured by a sensor SE. Implementation of the method of the invention is preferably controlled and coordinated by a control apparatus SG (not represented in the FIGURE), for example, is realized by a microprocessor.

If

Vol_HK_1, Vol_HK_2, Vol_HK_3 are the volumes of the three hollow bodies HK_1,

HK_2, HK_3

Vol_VL is the volume of the supply line VL p_HK_1_Set, p_HK_2_Set, p_HK_3_Set are the three specified set internal pressures for the three hollow bodies HK_1, HK_2, HK_3, and p_DE is the pressure which the pressure generator DE has generated and which impresses upon supply line VL when valve V_4 is opened and valve V_5 is closed.

The set internal pressures are greater by a multiple than the ambient pressure p_Umg which is, for example, equal to normal air pressure. The four volumes as well as the set internal pressures are known and are stored in control apparatus SG before beginning the process. The four volumes are, for example, known from the construction of the three hollow bodies HK_1, HK_2, HK_3 and the supply line VL or from experiments. The pressure generator DE is capable of generating any specified p_DE within an operating range. The ambient temperatures around the three hollow bodies HK_1, HK_2, HK_3 and the supply line VL are approximately equal.

Three upper limits )p_1, )p_2, )p_3 are specified for a pressure elevation in the three hollow bodies HK_1, HK_2, HK_3. Often )p_1=)p_2=)p_3 applies.

The actual internal pressure in each of the three hollow bodies is ascertained at the beginning of the process of the invention. The actual internal pressure of hollow body HK_1 is ascertained in that first all valves are closed in a first increment and subsequently the valve V_5 is opened through which the supply line VL is connected with a connection UMG with the environment. Following expiration of a certain time span, the internal pressure of the supply line VL is equal to the ambient pressure p_Umg. In a second increment, valve V_5 is closed and subsequently valve V_1 is opened. Following expiration of a further time span, the internal pressure of the supply line is equal to the internal pressure of the first hollow body HK_1. This concordant internal pressure is measured and is used as actual internal pressure of the first hollow body HK_1. This actual internal pressure is designated with p_HK_1$^{(0)}$. A lower limit for the two time spans is preferably ascertained through experiments conducted in advance. The other two actual internal pressures of HK_2 and HK_3 are correspondingly determined. The control apparatus SG stores the actual internal pressures p_HK_1$^{(0)}$, p_HK_2$^{(0)}$, p_HK_3$^{(0)}$ ascertained in this manner.

Pressure-raising steps are conducted successively for one of the three hollow bodies HK_1, HK_2, JK_3 in each case. In one design, the pressure-increasing steps are conducted cyclically for HK_1, HK_2, HK_3, then again HK_1, HK_2, HK_3 and so forth until the set internal pressures are reached. Such an alternative design provides that the control apparatus SG selects the hollow body for the next pressure-raising step in accordance with the difference between the internal pressure attained and the set internal pressure to be reached.

The control apparatus SG records the internal pressure henceforth attained in hollow body HK_1 after each pressure-raising step for HK_1. For this the control apparatus calculates what amount the pressure-raising step for HK_1 had and adds it to the old value for the internal pressure. Preferably, the control apparatus SG continues to record the internal pressure after each pressure elevation step in internal pressure occurring in the supply line VL.

If p_HK-1$^{(n)}$ designates the internal pressure in the first hollow body HK_1 after the n$^{th}$ pressure-raising step and p_HK_1$^{(0)}$ the internal pressure in HK_1 measured before beginning the pressure-raising stem, then $$p\_HK\_1^{(n)}=p\_HK\_1^{(0)}+p\_DES^{(1)}+\ldots+p\_DES^{(n)}.$$

Here p_DES$^{(i)}$ designates the amount of the i$^{th}$ pressure elevation step for HK_1 (i=1, . . . , n).

The following three designs are preferably provided for a pressure elevation step for HK_1:

In the first design, all valves are closed in a first increment. Subsequently, valve V_5 is opened until the internal pressure in the supply line VL is equal to ambient pressure. In a second increment, the valve V_4 is opened. The pressure generator impresses a pressure p_DE specified by the control apparatus SG on supply line VL. Valve V_4 remains open until the internal pressure in the supply line VL is equal to the impressed pressure p_DE. In a third increment, valve V_4 is closed and subsequently valve V_1 is opened until the same internal pressure has arisen in supply line VL and the first hollow body HK_1. Then valve V_1 is closed again.

In the second design, valve V_4 is opened only for a time span specified by time apparatus SG in the second increment in deviation from the first design. The time span is so short that the internal pressure in supply line VL is less after expiration of the time span than the pressure p_DE generated by pressure generator DE. Otherwise the second design agrees with the first.

In the third design, valve V_1 is opened only for a time span specified by the control apparatus in the third increment in deviation from the first design. The time span is so short that the internal pressure in the supply line VL is greater following the expiration of the time span than that in the first hollow body HK_1. Otherwise, the third design agrees with the first.

The duration of the second increment need not be monitored with the first design. It is sufficient, for example, to ascertain through experiments conducted in advance a lower limit for a time duration that is necessary so that the internal pressure of the supply line VL is equal to the generated pressure p_DE. Nonetheless, it should be guaranteed in each design that the specified upper limit )p_1 for a pressure elevation in HK_1 is not exceeded. In the first design, the volumes Vol_HK_1 of HK_1 and Vol_VL of VL as well as the generated pressure p_DE are available, in the second and third designs in addition the time span in which valve V_4 is opened in the second increment or valve V_1 is opened in the third increment. In the event that it cannot be guaranteed in the first design that the upper limit )p_1 will be maintained for a pressure-raising step, then a pressure-raising step in accordance with the second or third design is executed. The control apparatus SG can also change between designs if a monitoring of the time span is basically provided.

How the control apparatus SG determines the amount $p\_DES^{(n)}$ for the $n^{th}$ pressure-elevating step for HK_1, where n=1, 2, 3 . . . , in the event that the step is conducted according to the first design is described below. Let $p\_HK\_1^{(n-1)}$ and $p\_HK^{(n)}$ be the internal pressure of hollow body HK_1 before or after the $n^{th}$ pressure-increasing step for HK_1. Then $p\_HK^{(n)}=p\_DES^{(n)}+p\_HK\_1^{(n-1)}$.

The internal pressure of HK_1 remains unchanged in the first two increments and is increased only in the third increment. Before the third increment, HK_1 therefore has the internal pressure $p\_HK\_1^{(n-1)}$, thereafter $p\_HK^{(n)}$. The supply line VL has the internal pressure p_DE before the third increment and likewise partial pressure $p\_HK^{(n)}$ after this.

The calculation for $p\_DES^{(n)}$ proceeds from the law of the ideal gas. The volumes of hollow body HK_1 and supply line VL remain unchanged. Since moreover the ambient temperatures are identical, $$p\_HK\_1^{(n-1)}\cdot Vol\_HK\_+p\_1DE\cdot Vol\_VL=$$
$$p\_HK\_1^{(n)}\cdot Vol\_HK\_1+p\_HK\_1^{(n)}\cdot Vol\_VL=$$
$$[p\_HK\_1^{(n-1)}+p\_DES^{(n)}]\cdot[Vol\_HK\_1+Vol\_VL]=$$
$$p\_HK\_1^{(n-1)}\cdot Vol\_HK\_1+p\_HK\_1^{(n-1)}\cdot Vol\ VL$$
$$+p\_DES^{(n)}+[Vol\_HK\_1+Vol\_VL]$$

applies.

From this there follows:

$$p\_DES^{(n)}\cdot[Vol\_HK\text{-}1+Vol\_VL]=$$
$$p\_DE\cdot Vol\_VL\text{-}p\_HK\_1^{(n-1)}\cdot Vol\_VL=$$
$$[p\_DE\text{-}p\_HK\_1^{(n-1)}]\cdot Vol\_VL.$$

By solving for $p\_DES^{(n)}$, there results $$p\_DES^{(n)}=[p\_DE\text{-}p\_HK\_1^{(n-1)}]\cdot Vol\_VL/[Vol\_HK\_1+Vol\_VL]$$

The control apparatus conducts the calculations for the $n^{th}$ pressure-raising step before the $n^{th}$ pressure-raising step is executed. It ascertains the value for the pressure p_DE generated by the pressure generator DE and impressed upon supply line VL on the basis of the following changes:

The amount $p\_DES^{(n)}$ must be smaller than or equal to the upper limit.p_1 for the amount of the pressure elevation step for HK_1.

The internal pressure $p\_HK\_1^{(n)}$ following to the $n^{th}$ pressure-increasing step may not be greater than the set internal pressure p_HK_1_Set plus a specified tolerance. Otherwise a pressure reduction would be necessary after the $n^{th}$ pressure-raising step.

In order to reach the specified set internal pressure as fast as possible, preferably the greatest value is selected for p_DE which is still allowable in accordance with the above condition, if need be reduced by a safety deduction.

After conducting the $n^{th}$ pressure-elevating step, the control apparatus adds to the “old” internal pressure $p\_HK\_1^{(n-1)}$ the amount $p\_DES^{(n)}$, which yields the “new” internal pressure $p\_HK\_1^{(n)}$.

Corresponding relationships and marginal conditions apply for pressure-raising steps conducted for HK_2 and HK_3.

An analogous configuration of the process can be applied to reduce the internal pressures in the three hollow bodies HK_1, HK_2, HK_3 to three specified set internal pressures. The description once again relates to FIG. 1 with the change that the pressure generator DE is not needed for pressure reduction.

Pressure-reducing steps are conducted successively for in each case one of the three hollow bodies HK_1, HK_2, HK_3, and indeed cyclical or by selection of a hollow body by control apparatus SG as in the pressure elevation steps. The control apparatus SG calculates and records the internal pressure henceforth obtained for the first hollow body HK_1 following each pressure reducing step for HK_1. Let $p\_HK\_1^{(n)}$ be the internal pressure after conducting the $n^{th}$ pressure reduction step, and let $p\_DAS^{(n)}$ designate the amount of the $n^{th}$ pressure reduction step for HK_1 (i=1, . . . , n). Then $$p\_HK\_1^{(n)}=p\_HK\_1^{(0)}-p\_DAS^{(1)}-\ldots-p\_DAS^{(n)}.$$

The following two designs are preferably provided for a pressure-reducing step.

In the first design, all valves are closed in a first increment. Subsequently, valve V_5 is opened until the internal pressure in the supply line VL is equal to ambient pressure p_Umg. In a second increment, the valve V_5 is closed and subsequently valve V_1. V_1 remains opened until the same internal pressure has arisen in supply line VL and the first hollow body HK_1. After this valve V_1 is closed again.

In the second design, valve V_1 is opened only for a time span specified by the control apparatus in the second increment in deviation from the first design. The time span is so short that the internal pressure is lower following the expiration of the time span than that in the first hollow body HK_1. Otherwise, the second design agrees with the first.

How the control apparatus SG determines the amount $p\_DAS^{(n)}$ of a pressure reduction step for hollow body HK_1 which is conducted in accordance with the first design is described below. Let $p\_HK\_1^{(n)}$ designate the internal pressure in the first hollow body following the $n^{th}$ pressure-reducing step. Then $p\_HK\_1^{(n)}=p\_HK\_1^{(n-1)}-p\_DAS^{(n)}$.

Prior to the second increment, HK_1 has the internal pressure $p\_HK\_1^{(n-1)}$, after than the internal pressure $p\_HK\_1^{(n)}$. Supply line VL has ambient pressure p_Umg as an internal pressure prior to the second increment and likewise the internal pressure $p\_HK\_1^{(n)}$ following the second increment.

Therefore $$p\_HK\_1^{(n-1)}\cdot Vol\_HK\_1+p\_Umg\ Vol\_VL$$
$$=p\_HK\_1^{(n)}\cdot Vol\_HK\_1+p\_HK\_1^{(n)}\cdot Vol\_VL \text{ applies.}$$

The addend p_Umg. Vol_VL is negligibly small since the ambient pressure is small in relation to the internal pressure and the volume of supply line VL is small in relation to that of hollow body HK_1. Therefore $$p\_HK\_1^{(n-1)}\cdot Vol\_HK\_1=p\_HK\_1^{(n)}\cdot[Vol\_HK\_1+Vol\_VL]$$
$$=[p\_HK\_1^{(n-1}-p\_DAS^{(n)}]\cdot[Vol\_HK\_1+Vol\_VL]$$
$$=p\_HK\_1^{(n-1)}\cdot Vol\_HK\_1+p\_HK\_1^{(n-1)}\cdot Vol\_VL-$$
$$p\_DAS^{(n)}\cdot[Vol\_HK\_1+Vol\_VL] \text{ holds.}$$

From this there results:

$$p\_DAS^{(n)} \cdot [Vol\_HK\_1 + Vol\_VL] = p\_HK\_1^{(n-1)} \cdot Vol\_VL$$

and furthermore:

$$p\_DAS^{(n)} = p\_HK\_1^{(n-1)} \cdot Vol\_VL / [Vol\_HK\_1 + Vol\_VL].$$

Thus, only the two adjusting screws Vol_VL and Vol_HK_1 are available for a pressure reduction step in accordance with the first design, which is constant while the process is being implemented. The amount p_DAS$^{(n)}$ must be smaller than a specified upper limit.p__1 for pressure-reducing steps which are conducted for HK_1. Moreover, p_HK_1$^{(n)}$ must be greater than p_HK_1_Set minus a specified tolerance. If this is not possible, for example because p_HK_1$^{(n-1)}$ already lies near p_HK_1_Set, then a pressure reduction step is conducted in accordance with the second design. Preferably great numbers of characteristic curves are determined in advance in experiments which indicate the time course of the internal pressure in HK_1 in the second increment for various "old" internal pressures p_HK_1$^{(n-1)}$. The pressure course is here applied for various pressures p_HK_1$^{(n-1)}$ over the time span which has lapsed since opening the valve V_1. The control apparatus SF has read access to these characteristic curves which are stored digitally and ascertains (when needed, by interpolation) how long valve V_1 is open.

The process of the invention can then also be applied in an analogous design if the internal pressure is increased in some hollow bodies and reduced in others. The control apparatus SG decides for each hollow body whether the ascertained actual internal pressure is smaller or greater than the specified set internal pressure. For example, pressure-raising steps and pressure-reducing steps are conducted cyclically.

Reference number list and list of variable names

| Sign | Meaning |
|---|---|
| DE | Pressure generator |
| HK_1, HK_2, HK_3 | Hollow bodies whose internal pressure is to be brought to a specified value in any given case |
| p_DAS(n) | Amount of the n-th pressure reduction step |
| p_DE | Pressure generated by the pressure generator |
| p_DES(n) | Amount of the n-th pressure-raising step |
| p_HK_1(0) | Actual internal pressure of hollow body HK_1 before increase |
| p_HK_2(0) | Actual internal pressure of hollow body HK_2 before increase |
| p_HK_3(0) | Actual internal pressure of hollow body HK_3 before increase |
| p_HK_1_Set | Specified set internal pressure for hollow body HK_1 |
| p_HK_2_Set | Specified set internal pressure for hollow body HK_2 |
| p_HK_3_Set | Specified set internal pressure for hollow body HK_3 |
| p_Umg | Ambient pressure |
| SE | Sensor for supply line |
| SG | Control apparatus |
| UMG | Connection with the environment |
| V_1, V2, V_3 | Additional valves, valves between a hollow body and the supply line |
| V_4 | Second valve, valve between the pressure generator and the supply line |
| V_5 | First valve, valve between the supply line and the connection with the environment |
| VL | Supply line between pressure generator and hollow body |
| Vol_HK_1 | Volume of hollow body HK_1 |
| Vol_HK_2 | Volume of hollow body HK_2 |
| Vol_HK_3 | Volume of hollow body HK_3 |
| Vol_VL | Volume of the supply line |
| .p_1 | Specified upper limit for a pressure elevation in hollow body HK_1 |
| .p_2 | Specified upper limit for a pressure elevation in hollow body HK_2 |
| .p_3 | Specified upper limit for a pressure elevation in hollow body HK_3 |
| .q_1 | Specified upper limit for a pressure reduction in hollow body HK_1 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for increasing the internal pressure of a hollow body to a specified set internal pressure with a specified tolerance while using a pressure generator connected with the hollow body, whereby prior to the increase, the actual internal pressure of the hollow body is ascertained and during the increase a pressure generated by the pressure generator is ascertained, and wherein several pressure-increasing steps are conducted, whereby each pressure-increasing step comprises:

increasing the internal pressure of the hollow body by an amount that is smaller than or equal to a specified upper limit for a pressure increase in the hollow body;

calculating the amount of the pressure increase brought about by the pressure-increasing step by using the pressure generated by the pressure generator;

wherein conducting of said pressure-increasing steps is terminated as soon as a sum of the calculations based on the actual internal pressure prior to the increase and the amounts of all previously conducted pressure increases deviates from the set internal pressure by at most the specified tolerance.

2. The process according to claim 1, wherein at least one pressure-increasing step is conducted so that:

in a first increment, a second valve and an additional valve are closed and subsequently a first valve is opened, whereby the second valve is situated between the pressure generator and a supply line which joins the pressure generator with hollow body, the additional valve is situated between hollow body and supply line, and the first valve is situated between the supply line and a connection with the environment; and in a subsequent second increment, the first valve is closed and the second valve is open; and in a subsequent third increment, the second valve is closed and the additional valve is open.

3. The process according to claim 2, wherein;

the first increment is conducted at least until the internal pressure in the supply line is equal to the ambient pressure; and a constant pressure is generated by the pressure generator during the second increment.

4. The process according to claim 3, wherein the second increment is conducted at least until the internal pressure in the supply line is equal to the pressure generated by the pressure generator, and the second increment is conducted at least until the supply line and the hollow body have the same internal pressure.

5. The process according to claim 3, wherein:

the second increment is concluded before expiration of a previously determined time span; and the third increment is conducted until the supply line and the hollow body have the same internal pressure.

6. The process according to claim 3, wherein:

the second increment is conducted at least until the internal pressure in the supply line is equal to the pressure generated by the pressure generator; and the third increment is concluded after expiration of a previously determined time span.

7. The process according to claim 1, wherein the amount for the pressure generated by the pressure generator is determined as a function of the volume of the hollow body, the volume of the supply line, the sum on the basis of the actual internal pressure prior to the increase and the amounts of all previously conducted pressure-raising steps, and of the specified upper limit for a pressure increase in the hollow body.

8. The process according to claim 1, wherein the pressure generator is connected with a plurality of said hollow bodies through a supply line, and pressure-increasing steps are conducted in alternation for various of these hollow bodies.

9. The process according to claim 8, wherein the actual internal pressure of each of said hollow bodies is measured by approximation before increasing the pressure wherein, for each hollow body, the pressure in the supply line is reduced by closing a second valve and additional valves and by opening a first valve to ambient pressure, whereby the second valve is situated between the pressure generator and a supply line which connects the pressure generator with the hollow body, each additional valve is situated between a hollow body and the supply line in any given case, and the first valve is situated between the supply line and a connection with the environment, wherein the first valve is subsequently closed and the additional valve for said hollow body is kept open at least until the same internal pressure arises in the supply line and the hollow body, and the internal pressure which arises in the supply line is measured by a sensor on the supply line.

10. A process for reducing the internal pressure of a hollow body to a specified set internal pressure with a specified tolerance, whereby before reduction, the actual internal pressure of the hollow body is measured and the hollow body is joined with a connection with the environment, which has a lower pressure than the set internal pressure, wherein several pressure reduction steps are conducted, whereby for each pressure-reduction step includes;

reducing the internal pressure of the hollow body by an amount which is smaller than or equal to a specified upper limit for a pressure reduction in the hollow body;

calculating an amount of pressure reduction brought about by the pressure reduction step wherein the implementation of these pressure reduction steps is interrupted as soon as a sum of the calculation based upon the actual internal pressure prior to the reduction and the amounts of all previously conducted pressure reductions deviate from the set internal pressure by at most the specified tolerance.

11. The process according to claim 10, wherein at least one pressure-reducing step is carried out such that:

in a first increment an additional valve is closed and a first valve is opened, whereby the additional valve is situated between the hollow body and the connection line and the first valve is situated between the environment and a connection line which connects the hollow body with the environment; and in a succeeding second increment, the first valve is closed and the additional valve is opened.

12. The process according to claim 11, wherein;

the first increment is conducted at least until the internal pressure in the supply line is equal to the ambient pressure; and the second increment is conducted at least until the internal pressure in the hollow body is equal to the internal pressure in the supply line.

13. Use of the process according to one of claim 1 for altering pressure in a hollow body in a seat of a motor vehicle.

14. A device for conducting the process according to claim 1, wherein the device includes:

a pressure generator;

a supply line between the pressure generator, the hollow body and a connection with the environment;

a sensor for measuring the internal pressure of the supply line;

a first valve between the supply line and the connection with the environment;

a second valve between the pressure generator and the supply line;

an additional valve between the supply line and the hollow body; and a control apparatus for conducting pressure-raising steps.

15. A device for implementing the process according to claim 10, wherein the device includes:

a connection line between the hollow body and a connection with the environment;

a sensor for measuring the internal pressure of the supply line;

a first valve between the supply line and the connection with the environment;

an additional valve between the supply line and the hollow body; and a control apparatus for conducting pressure reduction steps.

* * * * *